(12) United States Patent
Ayyagari et al.

(10) Patent No.: US 12,113,636 B2
(45) Date of Patent: *Oct. 8, 2024

(54) CORRECT CONFERENCING PLATFORM RECORDING QUALITY ISSUES

(71) Applicant: International Business Machines Corporation, Armonk, NY (US)

(72) Inventors: Phani Kumar V. U. Ayyagari, Hyderabad (IN); Madan K Chukka, Hyderabad (IN); Martin G. Keen, Cary, NC (US); Vignesh Harish, Cary, NC (US)

(73) Assignee: International Business Machines Corporation Armonk, Armonk, NY (US)

(*) Notice: Subject to any disclaimer, the term of this patent is extended or adjusted under 35 U.S.C. 154(b) by 30 days.

This patent is subject to a terminal disclaimer.

(21) Appl. No.: 18/482,109

(22) Filed: Oct. 6, 2023

(65) Prior Publication Data

US 2024/0154832 A1 May 9, 2024

Related U.S. Application Data

(63) Continuation of application No. 18/052,328, filed on Nov. 3, 2022, now Pat. No. 11,817,964.

(51) Int. Cl.
*H04L 12/18* (2006.01)
*H04L 65/80* (2022.01)

(52) U.S. Cl.
CPC ...... *H04L 12/1827* (2013.01); *H04L 12/1831* (2013.01); *H04L 65/80* (2013.01)

(58) Field of Classification Search
CPC .. H04L 12/1827; H04L 12/1831; H04L 65/80
See application file for complete search history.

(56) References Cited

U.S. PATENT DOCUMENTS 10,701,394 B1 * 6/2020 Caballero .............. G06N 3/045
2005/0111832 A1   5/2005 Okauchi
(Continued)

FOREIGN PATENT DOCUMENTS

CN    113099161 A    7/2021
JP    2017537412 A   12/2017

OTHER PUBLICATIONS

Ayyagari et al., "Correct Conferencing Platform Recording Quality Issues", U.S. Appl. No. 18/052,328, filed Nov. 3, 2022, 25 Pages.
(Continued)

*Primary Examiner* — Raqiul A Choudhury
(74) *Attorney, Agent, or Firm* — Michael O'Keefe

(57) ABSTRACT

According to one embodiment, a method, computer system, and computer program product for web conference recording correction is provided. The embodiment may include identifying one or more quality issues with a server-side recording of a web conference. The embodiment may also include generating a reconstruction of the server-side recording wherein generating the reconstruction includes tagging a quality issue within the one or more quality issues with metadata, grouping the one or more quality issues based on a hierarchy of the metadata, transmitting a request for a client-side recording of the web conference based on the hierarchy and a reconstruction process, and performing the reconstruction process.

20 Claims, 2 Drawing Sheets

(56) References Cited

U.S. PATENT DOCUMENTS

| | | | |
|---|---|---|---|
| 2005/0216549 A1* | 9/2005 | Amano | G06Q 30/02 |
| | | | 709/227 |
| 2008/0100694 A1 | 5/2008 | Barkley | |
| 2009/0157810 A1* | 6/2009 | Tripathi | G06F 16/93 |
| | | | 709/204 |
| 2011/0113413 A1 | 5/2011 | Ewington | |
| 2015/0026603 A1 | 1/2015 | Tripathi | |
| 2015/0304607 A1* | 10/2015 | Bader-Natal | H04L 12/1813 |
| | | | 348/14.08 |
| 2015/0373063 A1* | 12/2015 | Vashishtha | H04N 7/155 |
| | | | 348/14.07 |
| 2019/0294804 A1 | 9/2019 | Di Lella | |
| 2021/0211742 A1 | 7/2021 | Wang | |
| 2022/0321946 A1* | 10/2022 | Panje | G11B 27/005 |
| 2023/0006850 A1* | 1/2023 | Liu | H04L 12/1827 |

OTHER PUBLICATIONS

Disclosed Anonymously, "A Method to Record Conferences Through Online and Offline Collaboration," IP.com, IP.com No. IPCOM000267057D, IP.com Publication Date: Sep. 21, 2021, 4 pages.

Disclosed Anonymously, "Reconciled Voice Audio Correction in Conferences," IP.com, IP.com No. IPCOM000264818D, IP.com Publication Date: Jan. 28, 2021, 5 pages.

IBM Appendix P, "List of patent and patent applications treated as related", Filed Herewith, 2 pages.

* cited by examiner

CORRECT CONFERENCING PLATFORM RECORDING QUALITY ISSUES

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others. Many such web conferencing applications also allow for the recording of meetings and conferences for sharing with participants and non-participants.

SUMMARY

According to one embodiment, a method, computer system, and computer program product for web conference recording correction is provided. The embodiment may include identifying one or more quality issues with a server-side recording of a web conference. The embodiment may also include generating a reconstruction of the server-side recording wherein generating the reconstruction includes tagging a quality issue within the one or more quality issues with metadata, grouping the one or more quality issues based on a hierarchy of the metadata, transmitting a request for a client-side recording of the web conference based on the hierarchy and a reconstruction process, and performing the reconstruction process.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
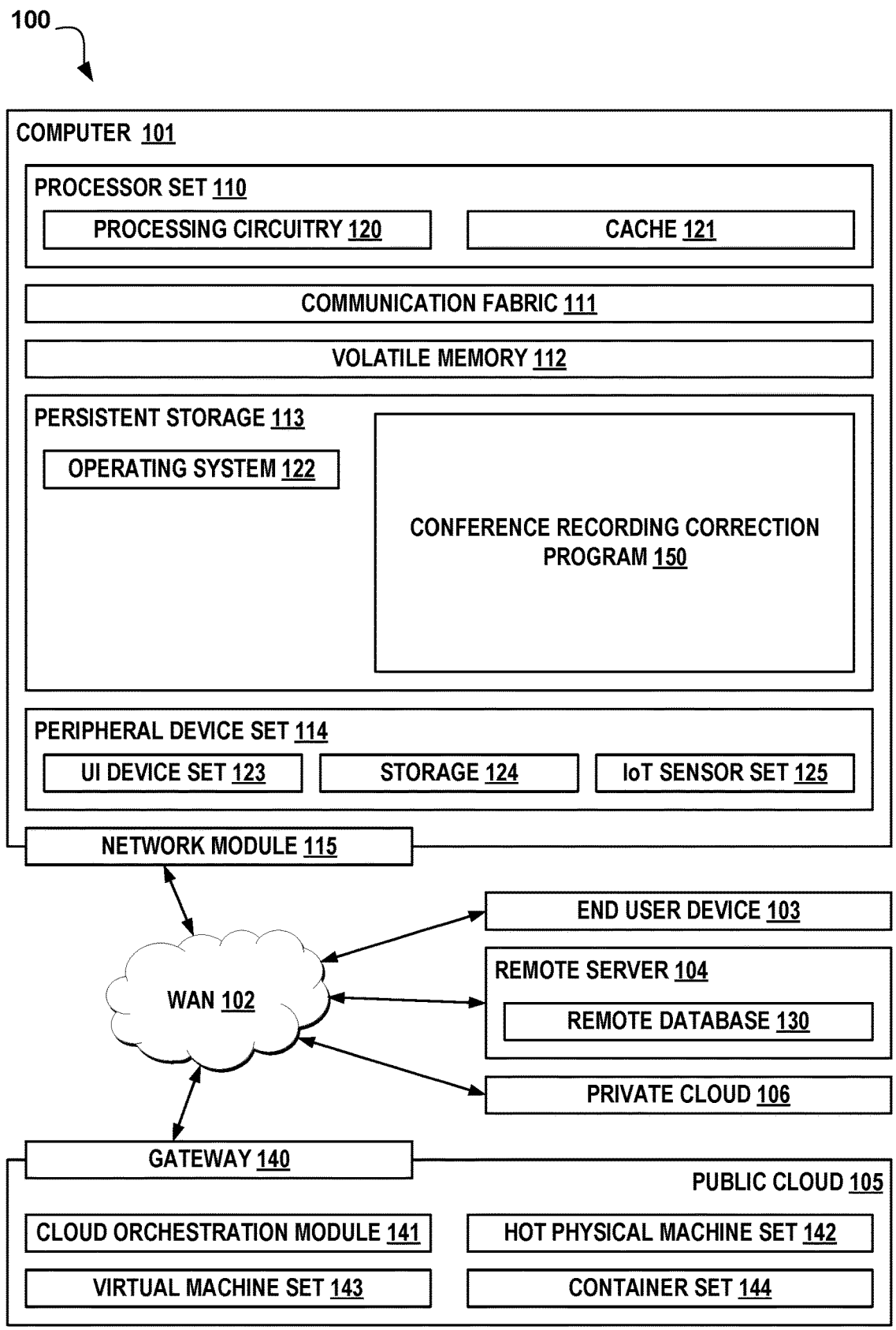
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to the web conferencing. The following described exemplary embodiments provide a system, method, and program product to, among other things, generate a web conference recording that cures any imperfections and/or interruptions. Therefore, the present embodiment has the capacity to improve the technical field of web conferencing by ensuring any recording of a web conference is free from imperfections, such as missing, blended, blurry, or fuzzy pixels; slow frame rates; or low bit rates in video feeds and missing or distorted voices in audio feeds.

As previously described, IT relates to an interrelated system of objects that are capable of transferring data across a network without requiring human participation. Currently, many devices available in the consumer marketplace are equipped with "smart" capabilities which include the capability to connect to a network through wired or wireless connections. These devices include many items from smartphones and wearables to refrigerators, lightbulbs, and vehicles. Despite many known uses in the commercial sphere, IT can also be utilized industrially to improve efficiency and reduce consumable resources. For example, implementing IoT technology throughout a city transportation or electrical grid may assist in reduction of traffic or inefficient energy usage.

Online conferencing software is an ever-increasing technological field with the modern prevalence of remote work, learning, and social connections. In many web conferencing situations, not all invited participants that desire to attend the web conference are able to join the live presentation for any number of reasons. Therefore, many web conferences are recorded to allow participants unable to join the live presentation or for live participants to rewatch/relisten to the live broadcast at a later, more convenient time. However, recordings can suffer from a number of problems that occur during the live presentation or call. For example, networking issues may result in inaudible words, poor frame rates, frozen frames, and participant disconnections and reconnections that create a poor quality recording of the web conference. As a result, a user, whether live or listening to the recording, may be left with an incomplete understanding of the subject matter of the web conference. As such, it may be advantageous to, among other things, utilize various local recordings of a web conference to replace low quality audio and/or video feeds, thereby resulting in a high quality primary recording of the web conference.

According to one embodiment, a conference recording correction program may identify portions of a web conference that are not recorded properly, associate the imperfect portion with a particular user responsible for utterances or video images occurring during the recorded portion, and create a corrected recording with locally recorded content. In order to achieve this goal, the conference recording correction program may communicate between an online meeting recording server and a local web conferencing client to replace missing recording gaps. Once the web conference is completed, the conference recording correction program may intelligently analyze the live recording to identify any damaged or missed content and request a local copy of the broken of missed content from a local recording of the user identified as speaking or screen sharing during the damaged or missed portion of content. The conference recording correction program may subsequently replace the imperfect content segment with another segment from a local recording on the user device associated with the specific user since a local recording does not likely exhibit an imperfection caused by latency and/or bandwidth issues experienced by a remote recording on a centralized server.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as conference recording correction program 150. In addition to conference recording correction program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and conference recording correction program 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in conference recording correction program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in conference recording correction program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the conference recording correction program 150 may identify each participant of a web conference and locally record the web conference to each corresponding user device. At the conclusion of the web conference, the conference recording correction program 150 may identify segments on a server-side recording that includes imperfections (e.g., garbled words or skipped video frames) possibly a result of connection issues to the network and replace the imperfect segments with the same timed segments from the client-side recording corresponding to the user device of the web conference participant(s) speaking at the time of the imperfections thus created a recording free of connection-caused imperfections. Furthermore, notwithstanding depiction in computer 101, the conference recording correction program 150 may be stored in and/or executed by, individually or in any combination, end user device 103, remote server 104, public cloud 105, and private cloud 106. The conference recording correction method is explained in more detail below with respect to FIG. 2.

Figure 2:
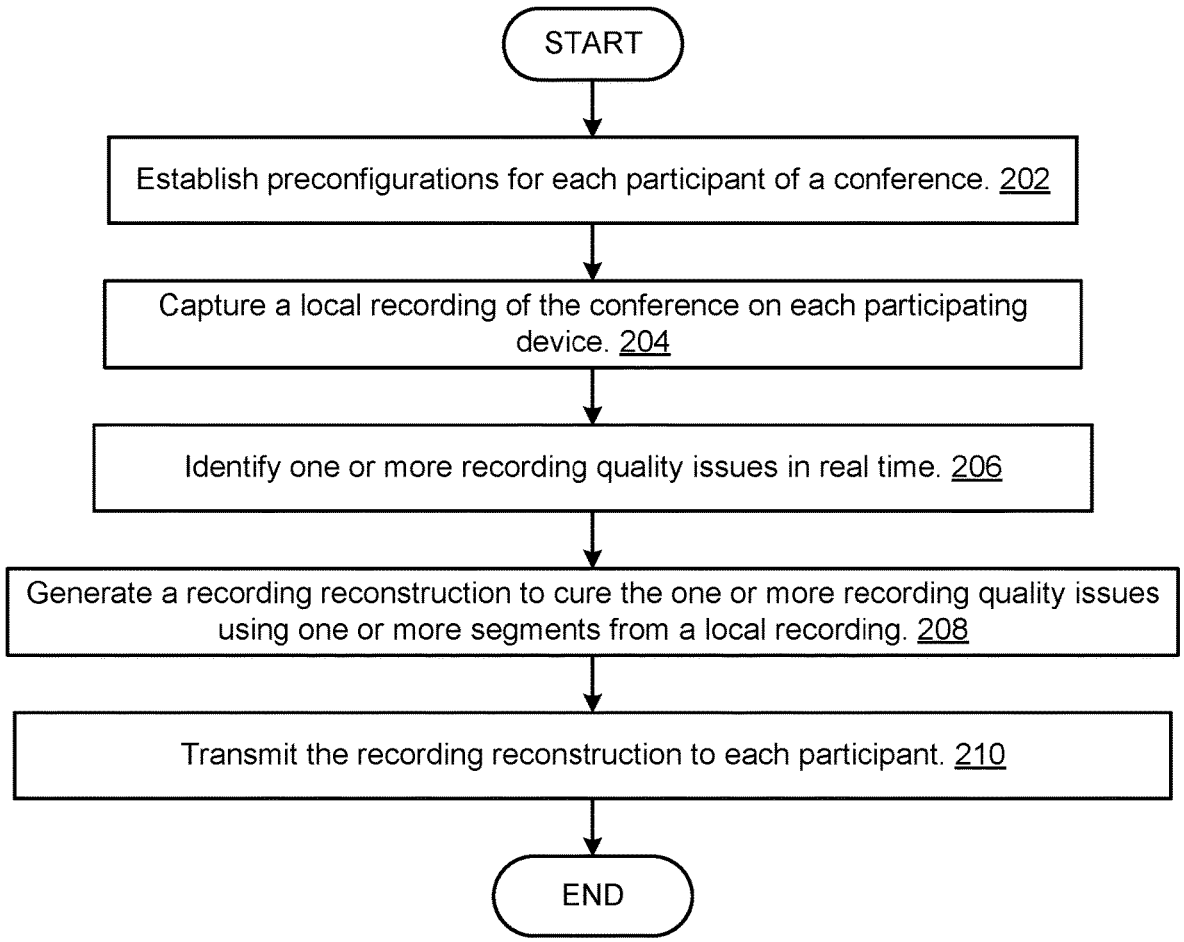
FIG. 2 illustrates an operational flowchart for a conference recording correction process according to at least one embodiment.

Referring now to FIG. 2, an operational flowchart for a conference recording correction process 200 is depicted according to at least one embodiment. At 202, the conference recording correction program 150 establishes preconfigurations for each participant of a web conference. When a host is initiating a web conference, the conference recording correction program 150 may allow the host user to configure various parameters related to the web conferencing event including, but not limited to, bit rate and audio rate settings. The conference recording correction program 150 may also allow the host user to define the meeting recording settings, such as indicating that the recording is to be used for replay purposes. In at least one other embodiment, the conference recording correction program 150 may allow individual participants to opt in or opt out of allowing local recordings on their respective user devices either upon initial set up of the conference recording correction program 150, from a settings menu, or upon joining the specific web conference. In an embodiment where a participant opts out of allowing the conference recording correction program 150 to locally record the web conference, the conference recording correction program 150 may not utilize that specific user's local recording for correcting imperfections in the server-side recording. Therefore, the conference recording correction program 150 may not correct all imperfections when one or more participants opt out.

Then, at 204, the conference recording correction program 150 captures a local recording of the conference on a user device corresponding to each conference participant. When a host user initiates a new web conference and begins a recording session, the conference recording correction program 150 communicates with each participating user's client device (e.g., computer 101), or with a client-side installation of the conference recording correction program 150, to enable local recording options on each respective client device. The conference recording correction program 150 may optimally adjust recording options for each client device based on rules and historical analysis of prior recorded web conferences. For example, participating client devices that have a history of poor network reception and a higher bit rate recording can be requested from the client to be recorded locally during the meeting. Similarly, client devices with a history of high-quality network reception may be requested to initiate only server-side recording of the web conference when the host user begins recording. Upon the host user initiating recording of a web conference (e.g., by interacting with a "record" icon on a graphical user interface), the conference recording correction program 150 may begin recording locally on either all client devices or only those client devices with networking histories resulting in poor recording conditions as defined in the recording options set by the conference recording correction program 150.

Next, at 206, the conference recording correction program 150 identifies one or more recording quality issues in real time. As the web conference transpires, the conference recording correction program 150 may monitor the quality of a server-side recording based on detection of recording quality issues in the server-side recording. The recording quality issues may be video-based or audio-based. Video-based quality issues may include, but are not limited to, frozen frames, slow frame rates, low bit-rate, missing pixels, and blurry or fuzzy pixels. Audio-based quality issues may include, but are not limited to, low bit-rate audio, audio interference, and stuttering audio. The conference recording correction program 150 may flag, or tag, each occurrence in the metadata of the recording in order to address a corrective action at the conclusion of the recording and/or web conference.

When identifying video-based quality issues, the conference recording correction program 150 may utilize a convolutional neural network (CNN) to analyze the recorded frames of the server-side recording in real-time while the web conference recording is being captured. As such, the conference recording correction program 150, using the CNN, may be capable of detecting imperfections in the recording based on various circumstances. For example, missing or blended pixels may result from artificial nose or other interference in the video stream, blurry or fuzzy pixels may be due to degradation of the quality of the video stream (e.g., high jitter being introduced by poor network conditions between participants), slow frame rates may be detected through freezes or drops in frame rate below a threshold, and low bit-rate video may be an indication of artificial noise introduced by a low quality network connection between participants. In one or more embodiments, the conference recording correction program 150 may assign a score for each video-based imperfection. Scores below a preconfigured threshold of acceptability may be marked for reconstruction by the conference recording correction program 150. The conference recording correction program 150 may consider the impact of any or all imperfections. For example, a blended pixel appearing on a person's face in the recording may be scored higher than a blended pixel occurring over the background. In such a situation, the blended pixel over a participant's face may result in the recording needing correction. However, the blended pixel obscuring the background may not require correction.

The conference recording correction program 150 may utilize one or more of audio fingerprinting and speech-to-text to identify audio-based issues with the web conference recording.

Audio fingerprinting may relate to an approach of identifying audio sources with high confidence accuracy. An audio fingerprint of known length may be created for each audio stream at the same time the audio stream is received by the conference recording correction program 150. The fingerprinting process may sum the energy of a block of samples over a period of time, also referred to as a frame size/length. The frame size may determine the granularity of the fingerprinting. Larger sizes may result in more granular fingerprints. The conference recording correction program 150 may scan all incoming audio streams and create an initial fingerprint for each audio stream. The conference recording correction program 150 may then compare the known fingerprints with the new fingerprints to identify matches or near matches. Matches that score above an upper-bound threshold (i.e., a confidence value) may be counted as potentially matching sources. Matches below a lower-bound threshold may not be considered a match and may be removed from the count. Poorly matching audio fingerprints may indicate a drop in audio quality and may be reconstructed as described in step 208.

Speech-to-text may relate to a cognitive service that attempts to derive a transcript from spoken content. If the speech-to-text algorithm scores below a given threshold (i.e., a confidence level) for a group of words, the conference recording correction program 150 may deem the spoken speech difficult to understand and applicable for reconstruction according to the process described in step 208.

In another embodiment, the conference recording correction program 150 may monitor the connection status of each participant's user device to the network (e.g., WAN 102). The connection status may indicate the quality of the data received in the server-side recording. Therefore, a poor condition status by any individual participant's user device to the server may indicate the presence of recording quality issues.

Then, at 208, the conference recording correction program 150 generates a recording reconstruction to cure the one or more recording quality issues using one or more segments from a local recording. Upon conclusion of the web conference, the conference recording correction program 150 may initiate post processing to create a replaceable recording of the conference based on the identification of recording quality issues. The conference recording correction program 150 may collect each flagged occurrence of an identified recording issue and group each occurrence hierarchically by issue type, participant, and timestamp. For example, if a specific participant was speaking when a recording quality issue occurred, the conference recording correction program 150 may group together all quality issues occurring during that specific participant's period of speaking. Similarly, the conference recording correction program 150 may create sub-groups of quality issues based on one or more of the metrics (i.e., participant, time period, and issue type). For example, if the conference recording correction program 150 has already grouped all flagged quality occurrences together for a specific participant, the conference recording correction program 150 may further group the quality occurrences to the user together into subgroups based on each occurrence type being audio-based or video-based quality issue.

The conference recording correction program 150 may transmit a request to each client-side iteration of the conference recording correction program 150 that experienced identified recording quality issues to retrieve a segment of the recording stored locally on a user device and transmit the segment to the server-side client of the conference recording correction program 150 for replacement in the server-side recording. Each client-side iteration of the conference recording correction program 150 may retrieve only the portions requested by the server-side conference recording correction program 150. For example, rather than uploading the full, locally-stored copy of a one-hour video recording of a web conference to address a frame rate issue that only occurred in the last five minutes of the server-side recording, the client-side conference recording correction program 150, having been identified by the server-side conference recording correction program 150 as storing an issue-free recording, may copy the last five minutes from the locally-stored recording and only upload the truncated, issue-free segment of the local recording to the server-side conference recording correction program 150.

As the truncated, issue-free recording segments from each client-side conference recording correction program 150 are received, the server-side conference recording correction program 150 may replace each segment of the server-side recording with the issue-free segments received from each client-side conference recording correction program 150. The server-side conference recording correction program 150 may determine the proper location within the complete server-side recording to replace each received truncated recording segment based on the metadata within each truncated segment. For example, each truncated segment may indicate the location within the overall, complete recording the segment belongs. Similarly, the conference recording correction program 150 may determine the location of each segment based on variety of techniques either individually or in any combination, such as, but not limited to, frequency analysis, audio fingerprinting, image recognition, speech-to-text, and natural language processing.

For video-based reconstruction, the conference recording correction program 150 may process each truncated segment to replace the quality issue-affected segments of the server-side recording through a variety of processes including, but not limited to, individual frame replacement, frame interval reconstruction, and pixel area reconstruction.

Individual frame replacement may relate to replacing entire frames with quality issues with video frames recorded locally on a participant's user device. The conference recording correction program 150 may use the audio stream and visual cues to derive which frame stored locally should replace a given frame requiring reconstruction.

Frame interval reconstruction may relate to replacing entire intervals of video containing one or more quality issues as opposed to merely individual frames. In some instances, an audio stream may continue between two distinct portions on a given web conference. A new interval may be defined for this portion of the web conference and the corresponding replacement video recorded locally on the participant's user device.

Pixel area reconstruction may relate to separating sub-samples of the recorded video into blocks pixels. The conference recording correction program 150 may analyze each pixel block in a web conference and segment the blocks in a particular image frame into smaller groups, or sub-samples. The conference recording correction program 150 may then replace the sub-samples of pixel blocks from the server-side recording containing quality issues with the pixel blocks not containing quality issues recorded on the client-side.

For audio-based reconstruction, the conference recording correction program 150 may process each truncated segment to replace the quality issue-affected segments of the server-side recording through a variety of processes including, but not limited to, waveform substitution and substitution of an entire audio stream.

Waveform substitution may relate to creating a waveform for each portion of audio that requires replacement with a similar energy profile. The server-side conference recording correction program 150 may transmit this energy profile, or fingerprint, to the client-side conference recording correction program 150 for matching against the client-side recordings for identification of recordings, or segments of recordings, with better quality audio that what was captured on the server-side recording.

If waveform substitution does not yield a suitable fingerprint for an energy profile or participant-captured audio yield an overall better quality recording, the conference recording correction program 150 may replace the relevant portion of the server-side recording with corresponding segments of the client-side recording. In another embodiment, the conference recording correction program 150 may replace the entire server-side recording with the client-side recording.

In a situation where multiple participants to the web conference are speaking concurrently, the conference recording correction program 150 may identify voices through voice recognition technology. The conference recording correction program 150 may capture audio locally and transmit the captured audio to the server-side iteration of the conference recording correction program 150 for identification the speakers based on a voice profile. When the conference recording correction program 150 identifies participants with low confidence, based on similar energy profiles or level of clarity, as well as those without a matching identifier, the conference recording correction program 150 ignores replacement options for such individuals since identification of locally stored audio on a user device is unlikely. When the conference recording correction program 150 identifies participants with a medium or high confidence, based on the energy profile and clarity, the conference recording correction program 150 may utilize waveform substitution for correct the audio-based quality issue. If a suitable match is not identified, the conference recording correction program 150 may replace and merge the entire audio stream of one participant in the server-side recording with the locally recorded audio for that participant.

Next, at 210, the conference recording correction program 150 transmits the recording reconstruction to each participant. Once the recording has been reconstructed to replace all quality issue segments, the conference recording correction program 150 may publish the recording through transmission to each participant of the web conference. In one or more embodiments, publishing the reconstruction may relate to transmitting the reconstruction to each web conference participant, or one or more non-participants, based on pre-configurations. For example, the conference recording correction program 150 may email the recording to each participant or may notify invitees to the web conference that were otherwise unable to attend that the reconstruction is available for viewing, listening, or downloading. In one or more other embodiments, the conference recording correction program 150 may only notify the host user that the reconstruction is available and allow the host to select specific individuals to whom the reconstruction should be transmitted or shared. In yet another embodiment, the conference recording correction program 150 may share the reconstruction to each participant or specific non-participants through an attachment of the reconstruction to a web conference calendar invitation or a cloud-based storage system.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    identifying one or more quality issues with a server-side recording of a web conference; and
    generating a reconstruction of the server-side recording comprising:
        tagging a quality issue within the one or more quality issues with metadata;
        grouping the one or more quality issues based on a hierarchy of the metadata;
        transmitting a request for a client-side recording of the web conference based on the hierarchy and a reconstruction process; and
        performing the reconstruction process.

2. The method of claim 1, wherein the one or more quality issues are audio-based or video-based.

3. The method of claim 2, wherein a convolutional neural network is utilized to analyze the server-side recording for video-based quality issues.

4. The method of claim 1, wherein the metadata comprises a speaking participant, a timestamp, and an issue type.

5. The method of claim 4, wherein the reconstruction process is based on the issue type and whether the quality issues are audio-based or video-based, and wherein an audio-based reconstruction process is selected from a group consisting of waveform substitution and substitution of an entire audio stream, and wherein a video-based reconstruction process is selected from a group consisting of individual frame replacement, frame interval reconstruction, and pixel area reconstruction.

6. The method of claim 2, wherein audio-based quality issues are selected from a group consisting of bit-rate audio below a threshold value, audio interference, and stuttering audio.

7. The method of claim 2, wherein video-based quality issues are selected from a group consisting of frozen frames, slow frame rates, bit-rate below a threshold value, missing pixels, blurry pixels, and fuzzy pixels.

8. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying one or more quality issues with a server-side recording of a web conference; and
    generating a reconstruction of the server-side recording comprising:
        tagging a quality issue within the one or more quality issues with metadata;
        grouping the one or more quality issues based on a hierarchy of the metadata;
        transmitting a request for a client-side recording of the web conference based on the hierarchy and a reconstruction process; and
        performing the reconstruction process.

9. The computer system of claim 8, wherein the one or more quality issues are audio-based or video-based.

10. The computer system of claim 9, wherein a convolutional neural network is utilized to analyze the server-side recording for video-based quality issues.

11. The computer system of claim 8, wherein the metadata comprises a speaking participant, a timestamp, and an issue type.

12. The computer system of claim 11, wherein the reconstruction process is based on the issue type and whether the quality issues are audio-based or video-based, and wherein an audio-based reconstruction process is selected from a group consisting of waveform substitution and substitution of an entire audio stream, and wherein a video-based reconstruction process is selected from a group consisting of individual frame replacement, frame interval reconstruction, and pixel area reconstruction.

13. The computer system of claim 9, wherein audio-based quality issues are selected from a group consisting of bit-rate audio below a threshold value, audio interference, and stuttering audio.

14. The computer system of claim 9, wherein video-based quality issues are selected from a group consisting of frozen frames, slow frame rates, bit-rate below a threshold value, missing pixels, blurry pixels, and fuzzy pixels.

15. A computer program product, the computer program product comprising:
    one or more computer-readable tangible storage medium and program instructions stored on at least one of the one or more tangible storage medium, the program instructions executable by a processor capable of performing a method, the method comprising:
    identifying one or more quality issues with a server-side recording of a web conference; and
    generating a reconstruction of the server-side recording comprising:
        tagging a quality issue within the one or more quality issues with metadata;
        grouping the one or more quality issues based on a hierarchy of the metadata;
        transmitting a request for a client-side recording of the web conference based on the hierarchy and a reconstruction process; and
        performing the reconstruction process.

16. The computer program product of claim 15, wherein the one or more quality issues are audio-based or video-based.

17. The computer program product of claim 16, wherein a convolutional neural network is utilized to analyze the server-side recording for video-based quality issues.

18. The computer program product of claim 15, wherein the metadata comprises a speaking participant, a timestamp, and an issue type.

19. The computer program product of claim 18, wherein the reconstruction process is based on the issue type and whether the quality issues are audio-based or video-based, and wherein an audio-based reconstruction process is selected from a group consisting of waveform substitution and substitution of an entire audio stream, and wherein a video-based reconstruction process is selected from a group consisting of individual frame replacement, frame interval reconstruction, and pixel area reconstruction.

20. The computer program product of claim 16, wherein audio-based quality issues are selected from a group consisting of bit-rate audio below a threshold value, audio interference, and stuttering audio.

* * * * *